Sept. 8, 1970   C. D. CRICKMER   3,527,064

MASTER BUSHING ASSEMBLY

Original Filed Jan. 4, 1967

Inventor
Charles D. Crickmer.

United States Patent Office 3,527,064
Patented Sept. 8, 1970

3,527,064
MASTER BUSHING ASSEMBLY
Charles D. Crickmer, 12923 Memorial Drive,
Houston, Tex. 77024
Continuation of application Ser. No. 607,237, Jan. 4,
1967. This application July 25, 1968, Ser. No. 747,742
Int. Cl. F16d 3/06
U.S. Cl. 64—23.5
17 Claims

ABSTRACT OF THE DISCLOSURE

An improved master bushing assembly capable of selectively driving either a pin drive kelly bushing or a square drive kelly bushing.

This application is a continuation of Ser. No. 607,237 filed Jan. 4, 1967, now abandoned.

Master bushings presently in use in the well drilling industry are of two general types, namely: those which function to drive a square drive kelly bushing; and those which function to drive a pin drive kelly bushing. Although it is desirable to have both the square and pin type master bushings vailable to the same rig concurrently, some operators cannot bear the expense involved in equipping themselves so fully. Additionally, if an operator does have both type master bushings available and drilling conditions dictate a desired change from a pin to a square drive kelly bushing or conversely, this necessitates the removal of the existing master bushing, for example a pin type, and inserting a square type in place thereof within the rotary table, thereby resulting in increased operation costs.

The present invention comprises a master bushing which, when used in conjunction with adapter means and/or spacer means, permits selective use of a pin drive or square drive kelly bushing without the need to change the master bushing as is required with conventional master bushings.

The objects and advantages of this invention will be more readily apparent from the following description and drawings of preferred embodiments of this invention in which.

Figure 2:
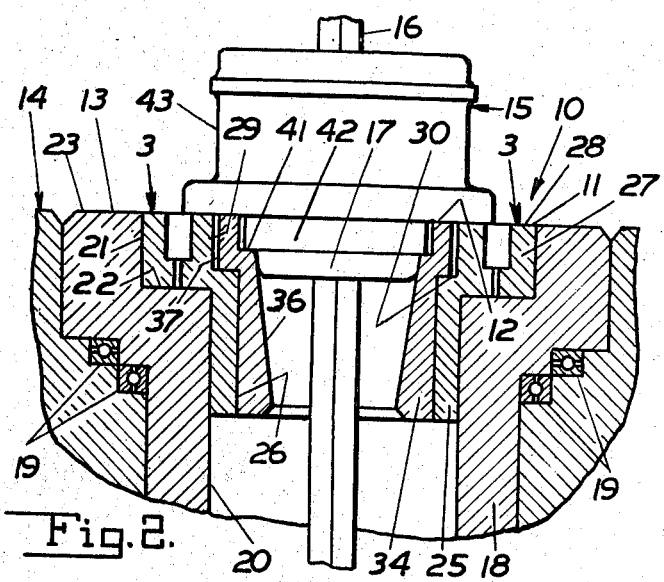
FIG. 2 is a front elevational view partly in section of the embodiment illustrated in FIG. 1 showing certain of the elements thereof operatively assembled together with a rotary table and square drive kelly bushing.
Figure 1:
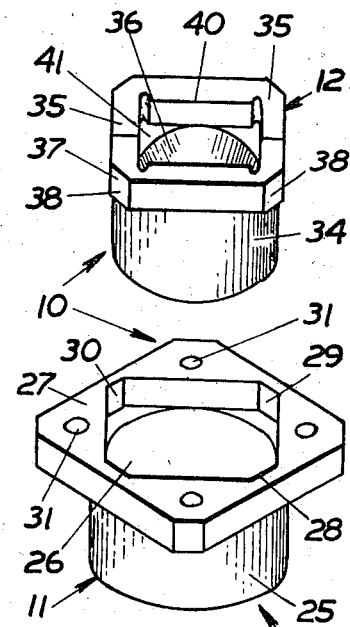
FIG. 1 is a perspective view of a master bushing assembly embodying one form of the present invention showing elements disassembled from one another.
Figure 3:
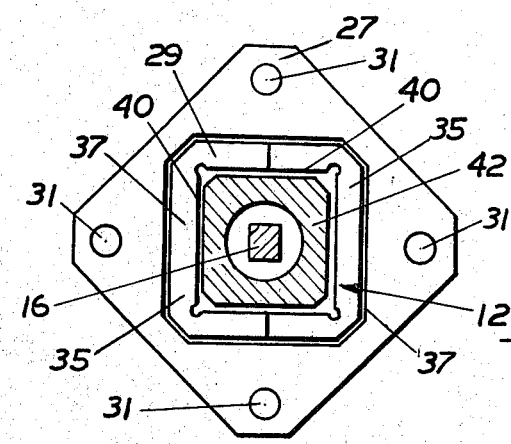
FIG. 3 is a view taken along the line 3—3 of FIG. 2 showing further details of construction.

Referring to FIGS. 1-3 of the drawings, 10 and 10' represent, respectively, a polygonal, shown as square, type master bushing assembly 10 comprising a master bushing 11 used in conjunction with a polygonal drive adapter, shown as a square drive adapter, insert 12 and a pin drive type master bushing assembly 10' comprising the master bushing 11 used in conjunction with a pin drive spacing adapter insert 113. FIG. 2 shows master bushing assembly 10 arranged to be rotatably driven in a well known manner in a suitably rotatably driven rotary table 13 which rotary table is suitably supported by a rotary table frame 14. A polygonal drive, shown as a square drive, kelly bushing 15 engaging a swivel supported kelly 16 for rotation about its longitudinal axis while at the same time permitting relative vertical movement of the kelly 16 to advance a connected drill string downwardly within a well, is suitably received in the square drive adapter insert 12. A familiar stabbing skirt 17 extends downwardly from a downwardly extending centrally disposed square drive 42 fixed to the under surface of the main body portion 43 of the kelly bushing 15. The master bushing assembly 10 coacts with the kelly bushing 15 for rotatably driving the kelly bushing 15.

The rotary table 13 includes a rigid tubular body section 18 supported in rotary table frame 14 by bearings 19 for rotation about its vertically extending longitudinal axis. The body section 18 has a lower cylindrical opening 20 and a larger upper generally square shaped opening 21 which together with lower opening 20 defines a generally square horizontal annular shoulder 22. The upper opening 21 extends up to the horizontal upper surface 23 of the rotary table 13.

The master bushing 11 includes a rigid tubular cylindrically externally shaped main body portion 25 complementary in external shape with and snugly received by lower opening 20 of rotary table 13. The inner opening 26 of body portion 25 is generally cylindrically shaped. A generally square shaped bevelled-corner flange 27 is fixed to the upper end portion of main body portion 25 and extends outwardly therefrom. Flange 27 has a generally flat horizontal upper surface 28 which, when master bushing 11 is interfitted with rotary table 13, is coplanar with the horizontal upper surface 23 of rotary table 13. Flange 27 also has a centrally disposed generally polygonal, as shown square, shaped recess 29 extending therewithin, which recess 29 has its center point coincident with the longitudinal axis of main body portion 25 and is greater in its side dimension than the diameter of inner opening 26, so that an annular shoulder 30 is defined between recess 29 and inner opening 26. The outer shape of flange 27 is complementary in shape with and snugly and non-rotatably received by the upper opening 21 of rotary table 13 such that the undersurface of flange 27 and shoulder 22 abut. The flange 27 has four longitudinally extending identical cylindrical openings 31 uniformly spaced at the corner portions of the flange 27 which receive the pin drive means (not shown) therein, of a pin drive kelly bushing (not shown) of a well known construction.

The square drive adapter insert 12 has a dual function of accommodating slips together with serving as the drive adapter means of the present invention, and includes a tubular cylindrically externally shaped lower portion 34 comprised of two identical semi-cylindrical bodies 35. The outer surface of lower portion 34 is complementary in shape to the inner opening 26 of body portion 25 of master bushing 11 and is removably received therein. Lower portion 34 has a frusto-conical downwardly tapering inner opening 36 suitably shaped for receiving slips. A generally square shaped bevelled-corner flange 37 comprised of two identical halves 38 is fixed to and extends outwardly from the upper end of lower portion 34. The outer shape of the sides of flange 37 is generally complementary in shape with that of the sides of recess 29 of main body portion 25 of master bushing 11, such that flange 37 is snugly and non-rotatably received in recess 29 with the upper surface of flange 37 being coplanar with the upper surface 28 of flange 27 of master bushing 11. Flange 37 has a centrally disposed longitudinally extending generally polygonal, shown as square, shaped opening 40 therewithin, which opening 40 has a side dimension greater than the major diameter of inner opening 36 of lower portion 34 so that an annular shoulder 41 is defined between opening 40 and inner opening 36. Square opening 40 of flange 37 is suitably sized to snugly removably receive the square drive portion 42 of kelly bushing 15.

The pin drive spacing insert 113 is used in combination with bushing 11 when a pin drive kelly bushing (not shown) of a well known construction, is rotatably driven by having the pin drive means (not shown) thereof received in openings 31 of flange 27. Insert 113 is dimensionally identical to the drive adapter insert 12 hereinabove described, with the exception that insert 113 has a differently shaped interior opening than insert 12, namely a frusto-conical downwardly tapering inner opening 32, which is suitably shaped for receiving a pin drive kelly bushing tapered guide skirt (not shown) of a well known construction therein. The exterior contact surfaces of inserts 12 and 113 are identical, therefore, no further description of insert 113 is believed necessary and it will be received within master bushing 11 in exactly the manner insert 12 is received as hereinabove described.

In addition, the principles of this invention taught by the embodiment hereinabove described and shown in FIGS. 1 through 3 may be applied to a master bushing which can be classified as an adapter receiving chamber, that is it, in itself, will have no drive provisions on the flange thereof, but will provide support for a square drive adapter insert or a pin drive adapter insert. The square drive adapter will be identical to insert 12 hereinabove described, however, the pin drive adapter will differ from insert 113 hereinabove described in that it will have drive pin receiving openings within the upper outwardly extending flange thereof. In this case the master bushing need not have the large flange that is required if the drive pin receiving openings were to be located therein.

Figure 5:
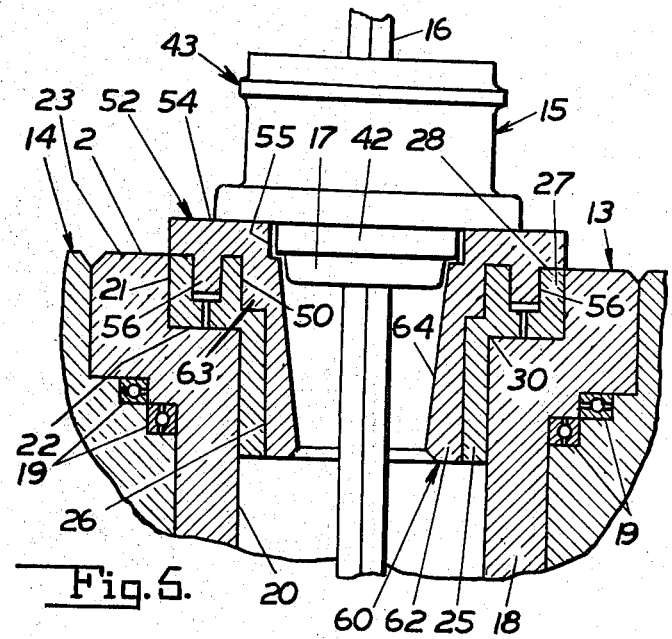
FIG. 5 is a front elevational view partly in section of the embodiment illustrated in FIG. 4 showing the elements thereof operatively assembled together with a rotary table and a square drive kelly bushing.
Figure 4:
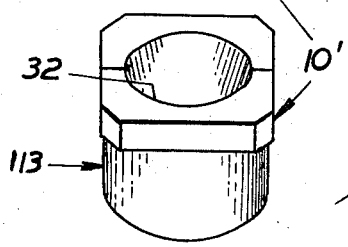
FIG. 4 is a perspective view of a master bushing assembly embodying a second form of the present invention showing elements disassembled from one another.
Figure 4:
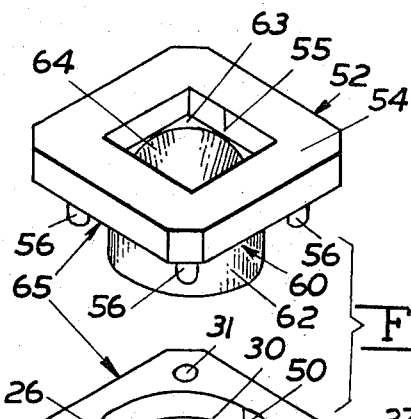

FIGS. 4 and 5 represent another embodiment of a polygonal, shown as square, drive master bushing assembly of the present invention generally indicated at 65, which comprises a pin drive master bushing 11', of a construction well known in the art, and a pin drive to polygonal, shown as square, drive adapter insert means, generally indicated at 52, which converts the pin drive master bushing 11' to the square drive master bushing assembly 65.

Since certain elements as shown in FIGS. 4 and 5 are identical to those of FIGS. 1 through 3, the same reference characters will be applied to corresponding elements. Master bushing 11' is dimensionally identical to the master bushing 11 hereinabove described and illustrated in FIGS. 1 through 3, with the exception that master bushing 11' has a differently shaped interior opening within the flange 27, namely a cylindrical opening 50. Additionally, as shown in FIGS. 4 and 5 the master bushing 11' is suitably arranged to be rotatably driven by the rotary table 13 suitably supported by the rotary table frame 14. The exterior contact surfaces of master bushings 11' and 11 are identical, therefore, no further description of master bushing 11' is believed necessary and it will be received within the rotary table 13 in exactly the manner master bushing 11 is received therein as hereinbefore described with reference to the embodiment of this invention illustrated in FIGS. 1 through 3.

The drive adapter means 52 includes an upper rigid flat plate portion 54 and an insert bowl portion 60 extending downwardly from the underside of plate portion 54. The plate portion 54 has a centrally disposed generally polygonal shaped, shown as square shaped, opening 55 therewithin and has external dimensions substantially the same as the dimensions of flange 27 of main body portion 25 of master bushing 11'. Square opening 55 is suitably sized and shaped, and plate portion 54 has a suitable thickness such that the square drive portion 42 of the square drive kelly bushing 15 will be snugly and non-rotatably received in square opening 55 as will be shown hereinafter.

Four cylindrically shaped pins 56 extends downwardly from and are rigidly fixed to the corner regions of the undersurface of plate portion 54 with the respective longitudinal centerlines of such pins 56 being substantially parallel with the vertical centerline of plate portion 54. Pins 56 have outer diameters substantially the same as the inner diameters of openings 31 in flange 27 of main body portion 25 of master bushing 11, with pins 56 having a longitudinal length to be received in openings 31 such that the undersurface of plate member 54 is flush with the upper surface 28 of flange 27.

Insert bowl portion 60 comprises a rigid cylindrically externally shaped body 62 being externally complementary shaped with and snugly removably received within the inner opening 26 of the main body 25 of master bushing 11'. An outwardly extending generally cylindrically shaped flange 63 comprises the upper portion of body 62, which flange 63 is integral with and extends downwardly from the underside of plate portion 54. The flange 63 has an external shape complementary with the shape of recess 50 of flange 27 of main body portion 25 of master bushing 11', such that flange 63 is snugly received in recess 50. The inner opening 64 of body 62 is shaped in a frusto-conical downwardly tapering manner for accommodating slips.

With plate portion 54 being mated with the master bushing 11' by interfitting pins 56 in openings 31 and insert bowl portion 60 into opening 26 the lower surface of the main body portion 43 of kelly bushing 15 will abut the upper surface of plate portion 54 and the square drive portion 42 of kelly bushing 15 will be snugly received in opening 55 with the lower surface of square drive portion 42 being coplanar with the upper surface 28 of flange 27.

Other embodiments more clearly illustrating the application of the principles of this invention are to be seen on pages 344 and 345 of Tools for Drilling, Producing, Fishing (68–69 catalogue) published by Baash-Ross Division of Joy Manufacturing Company, Houston, Tex. or equivalent pages shown on the composite catalogue of Oil Well Field Equipment and Services, 28th revision, published by World Oil.

Having described embodiments of my present invention and in accordance with the patent statutes, it is to be realized that modifications may be made without departing from the broad scope of the present invention. Accordingly, it is requested that the scope of this invention be not restricted to the specific forms shown for the uses mentioned except to the extent indicated in the appended claims.

What is claimed is:

1. A master bushing comprising: a body member having an opening extending therethrough and an outer configuration of a form that said body member is closely and non-rotatively received within the central opening of a given rotary drilling table with the axes of said openings being coincident; said opening in said body member being of a form to non-rotatively receive an adapter insert completely therein; said body member being partially in the form of an outwardly extending flange portion at the end thereof last receivable within such a central opening; and said flange portion having a plurality of parallel externally accessible open bores of a size and orientation to receive the pins of a known pin drive kelly bushing therein.

2. A master bushing as specified in claim 1 having a spacing adapter inserted in said opening in said body member, said insert comprising: a member having an outwardly extending flange portion at the end thereof last receivable within said opening in said body member; said member having a downwardly depending bowl portion; and said member having a circular central opening extending therethrough for the guiding and centering of a known pin drive kelly bushing.

3. A master bushing as specified in claim 2 wherein said flange portion of said member is in non-rotatable engagement with said body portion.

4. A master bushing as specified in claim 1 having a driving adapter inserted in said opening in said body member, said insert comprising: a member having an outwardly extending flange portion at the end thereof last receivable within said opening in said body member; and said member having a central polygonal cross-sectional opening at the upper end thereof of a size and orientation to non-rotatively receive a drive portion of a known polygonal drive kelly bushing.

5. A master bushing as specified in claim 4 wherein said flange portion of said member is in non-rotatable engagement with said body portion.

6. A master bushing as set forth in claim 4 wherein said polygonal cross sections are both square cross sections.

7. A master bushing assembly comprising: a body member having an opening extending therethrough and an outer configuration of a form that said body member is closely and non-rotatively received within the central opening of a given rotary drilling table with the axes of said openings being coincident; a driving adapter insert having an outer configuration of a form that said insert is non-rotatively received within said opening extending through said body member; and said insert having a central polygonal cross-sectional opening at the upper end thereof of a size and orientation to non-rotatively receive a drive portion of a known polygonal drive kelly bushing.

8. A drive adapter for downward insertion into a pin drive kelly bushing wherein said adapter comprises: a body member having an opening extending centrally therethrough, said body having a lower portion with an external configuration coaxial with said opening and complementary and slidably receivable in an insert bowl passageway of a known pin drive master bushing, said opening having a configuration at the upper end thereof for receiving the square drive portion of a square drive kelly bushing and a configuration extending downwardly from said upper end thereof for receiving slip member; and drive pins for drivingly cooperating with said known pin drive master bushing and said body member.

9. A master bushing assembly comprising a drive adapter as specified in claim 8 in combination with a pin drive master bushing wherein said main body upper end surface becomes coplanar with the upper surface of said master bushing upon being so inserted.

10. A master bushing assembly comprising: a master bushing having means for accommodating a selected one of a pin drive insert and a square drive insert therein in combination with said selected one of said inserts providing for driving connection to a kelly drive bushing.

11. A master bushing assembly as specified in claim 10 wherein said master bushing has an upwardly open through bore with a top portion of polygonal internal cross section.

12. A master bushing assembly as specified in claim 11 wherein said selected one of said inserts is a pin drive spacing insert having a top external profile of mating polygonal cross section with said through bore top portion.

13. A master bushing assembly as specified in claim 11 wherein said selected one of said inserts is a polygonal drive adapter insert having a top external profile of mating polygonal cross section with said through bore top portion and an upwardly open central recess of polygonal cross section mateable with a known polygonal drive kelly bushing.

14. A master bushing assembly as specified in claim 13 wherein all of said polygonal cross sections are square cross sections.

15. An adapter insert for a pin drive master bushing, said adapter insert having drive pins thereon for drivingly mating with a known pin drive master bushing and said adapter having an internal upwardly open recess of polygonal cross section mateable with the polygonal drive portion of a known polygonal drive kelly bushing.

16. A master bushing assembly comprising: a pin drive master bushing in combination with an adapter insert as specified in claim 15 for prividing driving connection between rotary drilling table and a polygonal drive kelly bushing.

17. A master bushing assembly as specified in claim 16 wherein said polygonal cross sections are square cross sections.

References Cited
UNITED STATES PATENTS

| | | | |
|---|---|---|---|
| 1,628,303 | 5/1927 | Harris et al. | 64—23.5 X |
| 1,864,952 | 6/1932 | Smith | 64—23.5 |
| 2,204,112 | 6/1940 | Abegg | 64—23.5 X |
| 2,286,593 | 6/1942 | Abegg | 64—23.5 |
| 2,306,130 | 12/1942 | Long | 64—23.7 |
| 2,904,311 | 9/1959 | Spiri | 64—23.7 |

JAMES A. WONG, Primary Examiner